United States Patent
Boegge et al.

[11] Patent Number: 6,106,012
[45] Date of Patent: Aug. 22, 2000

[54] DEFLECTION FITTING FOR SEAT BELTS OF VEHICLES

[75] Inventors: Herbert Boegge, Wiernsheim; Guenter Dietrich, Freiberg; Juergen Straehle, Tamm; Michael Menking, Nauhausen, all of Germany

[73] Assignee: Dr. Ing. h.c.F. Porsche AG, Weissach, Germany

[21] Appl. No.: 09/170,197

[22] Filed: Oct. 13, 1998

[30] Foreign Application Priority Data

Oct. 11, 1997 [DE] Germany ............... 197 45 016

[51] Int. Cl.⁷ ............................................. B60R 22/00
[52] U.S. Cl. ........................... 280/801.1; 280/805
[58] Field of Search ..................... 280/801.1, 805, 280/808; 297/464, 468, 482, 483

[56] References Cited

U.S. PATENT DOCUMENTS

| 5,529,344 | 6/1996 | Yasui et al. ........................ 280/808 |
| 5,692,780 | 12/1997 | Yasui .................................. 280/801.2 |
| 5,746,449 | 5/1998 | Hiroshige ........................... 280/808 |
| 5,820,164 | 10/1998 | Patel et al. .......................... 280/808 |
| 5,863,069 | 1/1999 | Wickenheiser et al. ............ 280/751 |
| 5,941,567 | 8/1999 | Wickenheiser ..................... 280/808 |
| 6,007,100 | 12/1999 | Steffens, Jr. ........................ 280/801.1 |

FOREIGN PATENT DOCUMENTS

| 2 660 264 | 10/1991 | France . |
| 33 08 531 | 9/1984 | Germany . |
| 196 54 344 | 7/1997 | Germany . |

*Primary Examiner*—Paul N. Dickson
*Assistant Examiner*—Faye M. Fleming
*Attorney, Agent, or Firm*—Evenson, McKeown, Edwards & Lenahan, P.L.L.C.

[57] ABSTRACT

A deflection fitting for seat belts of vehicles, particularly motor vehicles, is held in position via a fastening screw. A head section of the fastening screw and at least a partial area of the deflection fitting is covered by a cap in the direction of the occupant compartment. In the event of a head impact of a vehicle occupant onto the deflection fitting or onto the head section of the fastening screw, the risk of injury is reduced by a hollow-body-shaped deformation element disposed between the fastening screw and the cap, which is made of thin-wall sheet metal.

12 Claims, 6 Drawing Sheets

DEFLECTION FITTING FOR SEAT BELTS OF VEHICLES

BACKGROUND AND SUMMARY OF THE INVENTION

This application claims the priority of German patent 197 45 016.4, filed Oct. 11, 1997, the disclosure of which is expressly incorporated by reference herein.

The invention relates to a deflection fitting for seat belts of vehicles, particularly motor vehicles, which is held in position via a fastening screw, a head section of the fastening screw and at least a partial area of the deflection fitting being covered by a cap toward an occupant compartment.

From German Patent Document DE 33 08 531 C2, a deflection fitting for seat belts of vehicles, particularly motor vehicles, is known which is held in position on the vehicle frame via a fastening screw. The head of the fastening screw is covered by a cap made of plastic which is held in position on a cover plate of the deflection fitting. Such a cap only has the purpose of visually covering the deflection fitting and the fastening screw. However, in the event of an impact of a vehicle occupant's head on the deflection fitting or the head section of the fastening screw, this cap is not suitable for sufficiently absorbing impact energy so that, in the event of a head impact on the deflection fitting, the vehicle occupant may suffer relatively serious head injuries.

For reducing head injuries in the event of a head impact onto the deflection fitting of a seat belt, it is known from French Patent Document FR 26 60 264 A1 to construct a cap manufactured of plastic in an energy-absorbing manner. In the head impact area, the cap extends at a distance from the head of the fastening screw. In the event of a head impact, impact energy is to be absorbed by the compression of the cap. This construction also only results in a relatively low absorption of energy in the event of a head impact.

It is an object of the invention to further develop a deflection fitting of a seat belt, which is held in position via a fastening screw and is covered by a cap situated adjacent thereto, such that, in the event of an impact of a vehicle occupant's head onto the deflection fitting, a relatively high impact energy can be absorbed so that the risk of injury to a vehicle occupant in the event of a head impact is considerably reduced.

This and other objects have been achieved according to the present invention by providing deflection fitting for a seat belt of a motor vehicle, which is held in position via a fastening screw, a head section of the fastening screw and at least a partial area of the deflection fitting being covered by a cap toward an occupant compartment of the vehicle, wherein a hollow deformation element is disposed between the head section of the fastening screw and the cap, said deformation element being made of thin-walled sheet metal.

This and other objects have been achieved according to the present invention by providing deflection fitting for a seat belt of a motor vehicle, the deflection fitting being mounted on a belt adjusting device comprising a holding rail fastened to the vehicle body and an adjusting member displaceably movably arranged on the holding rail, the deflection fitting being fastened on the adjusting member via a fastening screw, wherein a deformation element is held in position by a supporting part on the adjusting member of the belt adjusting device, the deformation element resting in sections on a head section of the fastening screw.

The principal advantages achieved by the invention are that, due to the arrangement of an additional deformation element made of a thin-walled metal sheet between the head of the fastening screw and the cap disposed adjacent thereto, an effective energy absorption is achieved in the event of a head impact.

The hollow-body-type deformation element is made of a thin-walled aluminum sheet or steel plate or of an energy-absorbing structure (such as metal foam) and can be manufactured and mounted in a simple manner. The deformation element can be used in the case of a stationary deflection fitting as well as in the case of a vertically adjustable deflection fitting.

According to certain preferred embodiments, the deformation element is constructed in two parts and is composed of a base plate and of a deformation body placed on it. In the case of a vertically adjustable deflection fitting, the deformation element is fastened via a supporting part on a displaceable adjusting member of the belt level adjusting device. Furthermore, a fixing device for the deformation element is provided between the head of the fastening screw and the deformation element disposed on it. The cap manufactured of plastic is essentially used only for introducing force into the deformation element situated underneath and only to a very small extent for the absorption of energy.

Other objects, advantages and novel feature of the present invention will become apparent from the following detailed description of the invention when considered in conjunction with the accompanying drawings.

DETAILED DESCRIPTION OF THE DRAWINGS

Figure 1:
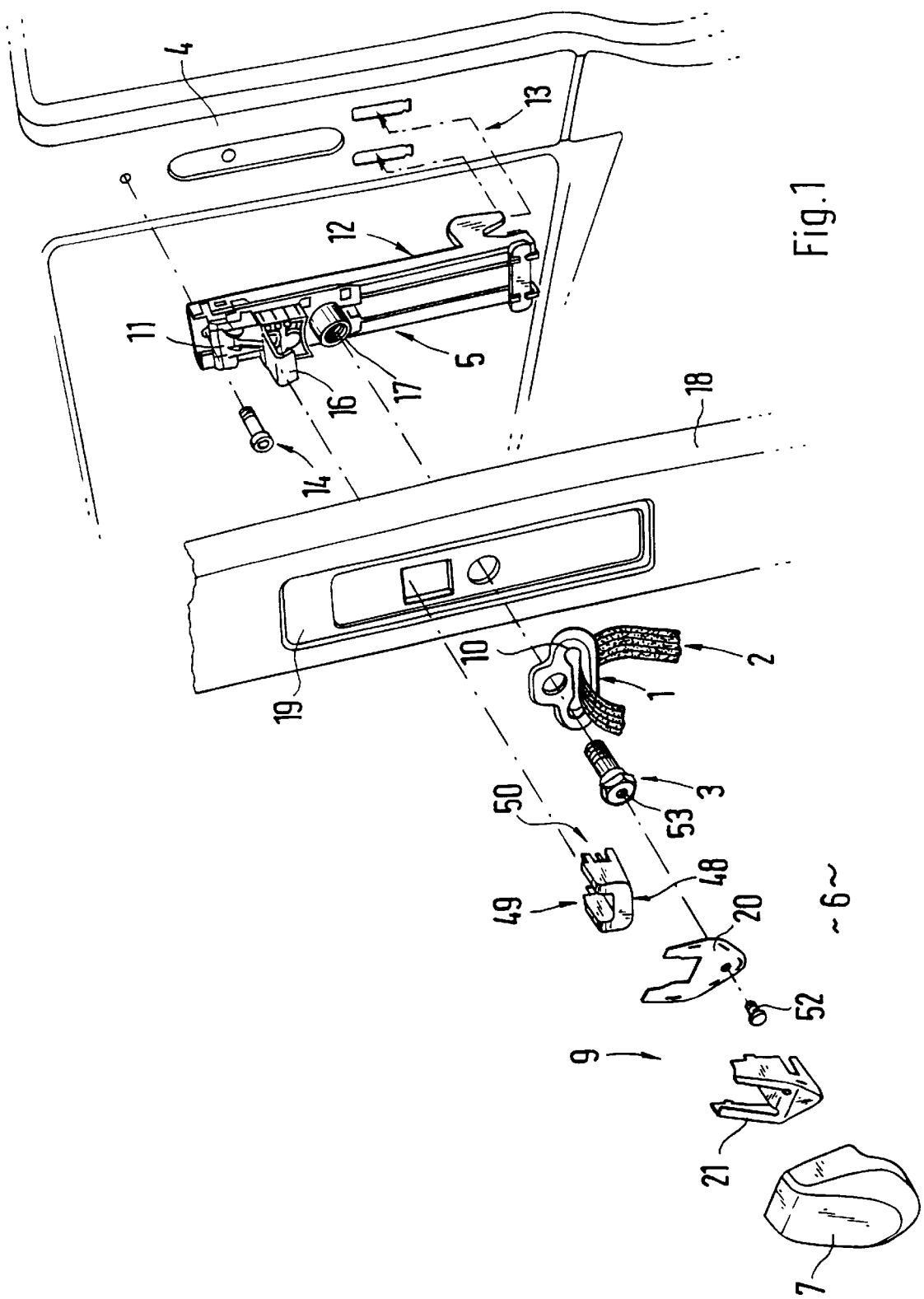
FIG. 1 is an exploded view of an upright column of a motor vehicle with a belt deflection fitting for a seat belt according to a preferred embodiment of the present invention arranged approximately at the level of a vehicle occupant's shoulder, the belt deflection fitting being mounted on a belt level adjusting device.

FIG. 1 is an exploded view of a deflection fitting 1 for a seat belt 2 of a vehicle, particularly a motor vehicle, which deflection fitting is arranged approximately at the level of an occupant's shoulder and is fastened by means of a fastening screw 3 either directly on an upright body column 4 or a belt level adjusting device 5 provided on the body column 4. In the illustrated embodiment, the seat belt 2 is a conventional three-point seat belt. On the side of the deflection fitting facing an occupant compartment 6, a cap 7 made of plastic which is disposed in front (i.e., in the direction of the occupant compartment) is provided which covers a head section 8 of the fastening screw 3 and at least a partial area of the deflection fitting 1. In the event of an impact of a vehicle occupant's head onto the deflection fitting 1, the risk of injury to the vehicle occupant is reduced by a hollow-body-type deformation element 9 made of a thin-walled metal sheet. The hollow-body-type deformation element 9 is disposed between the fastening screw 3 and the cap 7 situated in front, which metal sheet deforms plastically in the event of head impact and thus absorbs a relatively large amount of impact energy.

Figure 2:
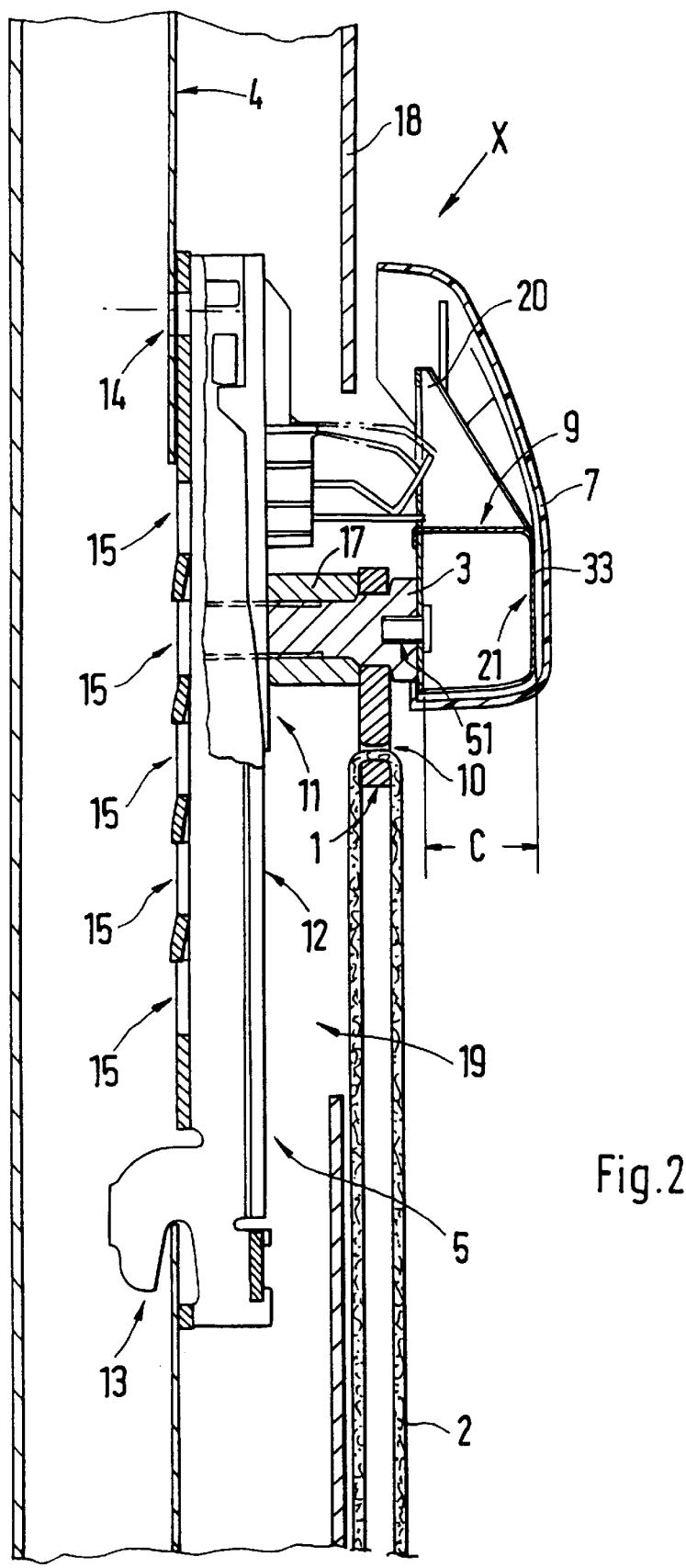
FIG. 2 is a vertical sectional view of the body column, the belt deflection fitting and the belt level adjusting device with the deformation element of FIG. 1 in an assembled position.

In the illustrated embodiment, the deflection fitting 1 has a passage opening 10 for the seat belt 2 and is fastened on an adjusting member 11 of the belt level adjusting device 5. The belt level adjusting device 5 comprises an elongated holding rail 12 which extends in the vertical direction and which, by way of at least one lower plug-type connection 13 and an upper screw-type connection 14, can be fastened on the body column 4 (FIG. 2). On the holding rail 12, which has an approximately C-shaped profile when viewed from above, the adjusting member 11 is displaceably accommodated, which adjusting member 11 can be fastened in one of several detents 15 arranged above one another via a control element which is swivellably disposed on the adjusting member 11 and is constructed as an angle lever (not shown in further detail). One lever arm of the spring-loaded angle lever engages in one of the detents 15, whereas the other lever arm is in an operative connection with a swivellable operating element 16 of the belt level adjusting device 5. By swivelling of the operating element 16, the angle lever is swivelled and the lever arm facing away from the operating member 16 is disengaged from the detent 15 so that, in this position, the adjusting member 11 can be moved in the vertical direction. In addition, a bush or a plate with an internal thread section is provided on the adjusting member 11, into which internal thread section the fastening screw 3 can be screwed which carries the deflection fitting 1.

Between the side of the adjusting member 11 facing the vehicle occupant compartment 6 and the side of the deflection fitting 1 facing away from the head section 8 of the fastening screw 3, a spacing sleeve 17 is arranged which coaxially surrounds the fastening screw 3. Toward the occupant compartment 6, the body column 4 is covered by a covering part 18 which has at least one recess 19 in the area of the belt level adjusting device 5.

The deformation element 9 made of thin-walled steel plate or aluminum sheet may be constructed in one or several pieces. The illustrated embodiment shows a two-piece construction of the deformation element 9 which is composed of a base plate 20 and of a deformation body 21 placed on the base plate 20.

Figure 3:
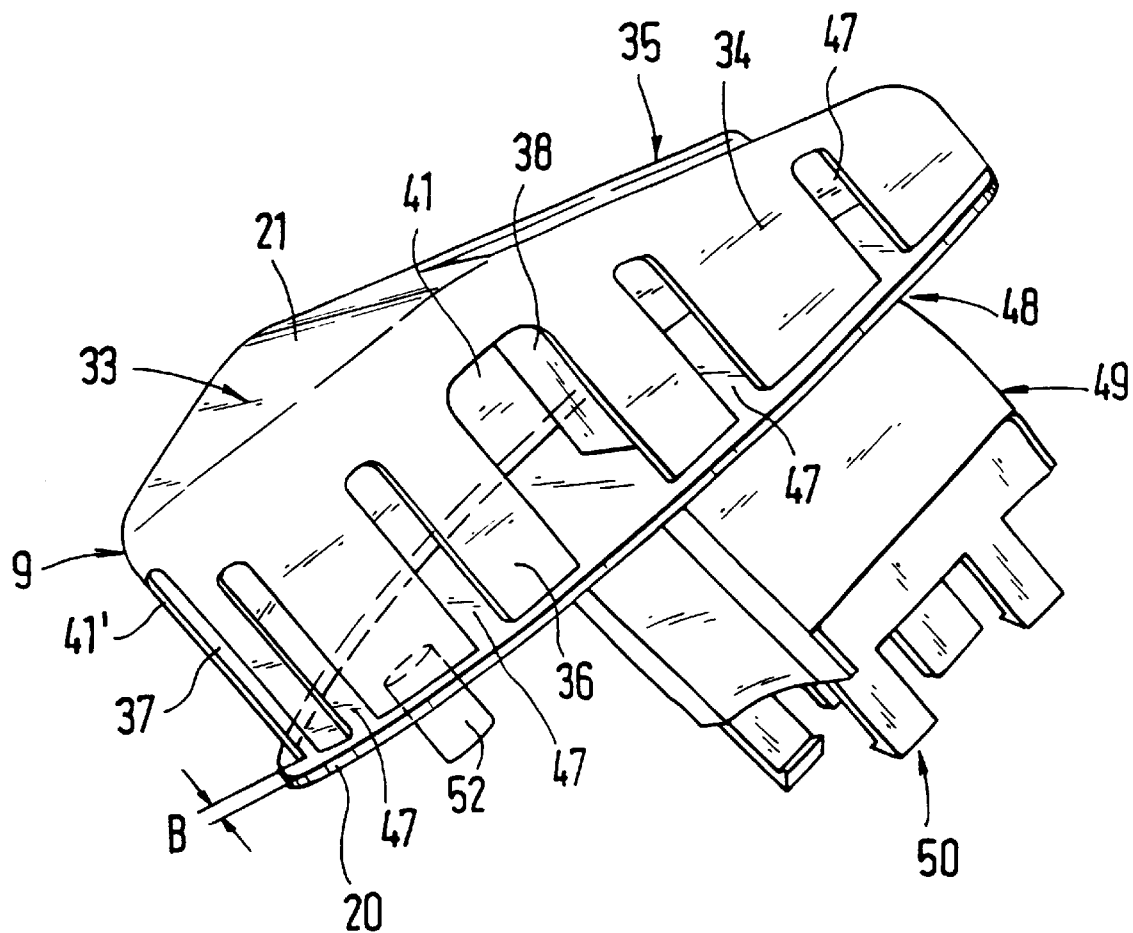
FIG. 3 is a perspective view of the deformation element.
Figure 4:
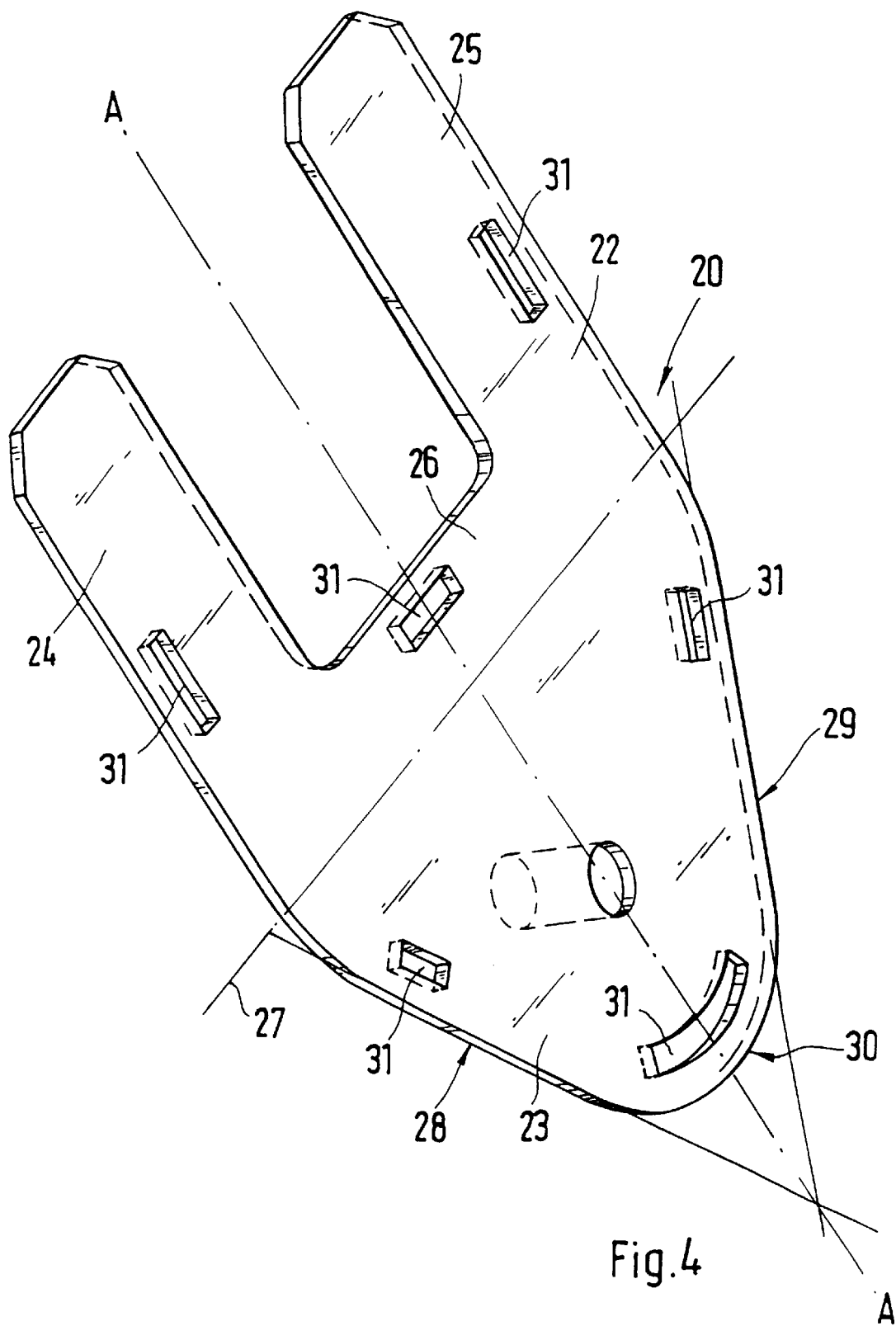
FIG. 4 is a perspective view of the base plate of the deformation element.

According to FIG. 4, the base plate 20 has a plane construction and is composed of a U-shaped section 22 and of an approximately triangular section 23. The U-shaped section 22 comprises lateral upright legs 24, 25 and a transversely extending web 26. The triangular section 23 adjoins this web 26. An imaginary line of separation between the U-shaped section 22 and the triangular section 23 has the reference number 27. Two corner points of the triangular section 23 are situated on this line of separation 27, whereas the third corner point points downward and extends approximately on an upright center plane A—A of the belt level adjusting device 5. The two diagonally extending sides 28, 29 of the triangular section 23 are connected with one another by a radius-shaped transition area 30. The base plate 20 protrudes by a slight amount (measurement B—see FIG. 3) beyond the deformation body 21 on the exterior sides of the legs 24, 25 as well as the sides 28, 29 and the transition area 30. The base plate 20 and the deposited deformation body 21 are connected with one another at least locally by way of flanging, welding, gluing or the like. The base plate 20 may also have a different shape than that shown in the illustrated embodiment.

Figure 5:
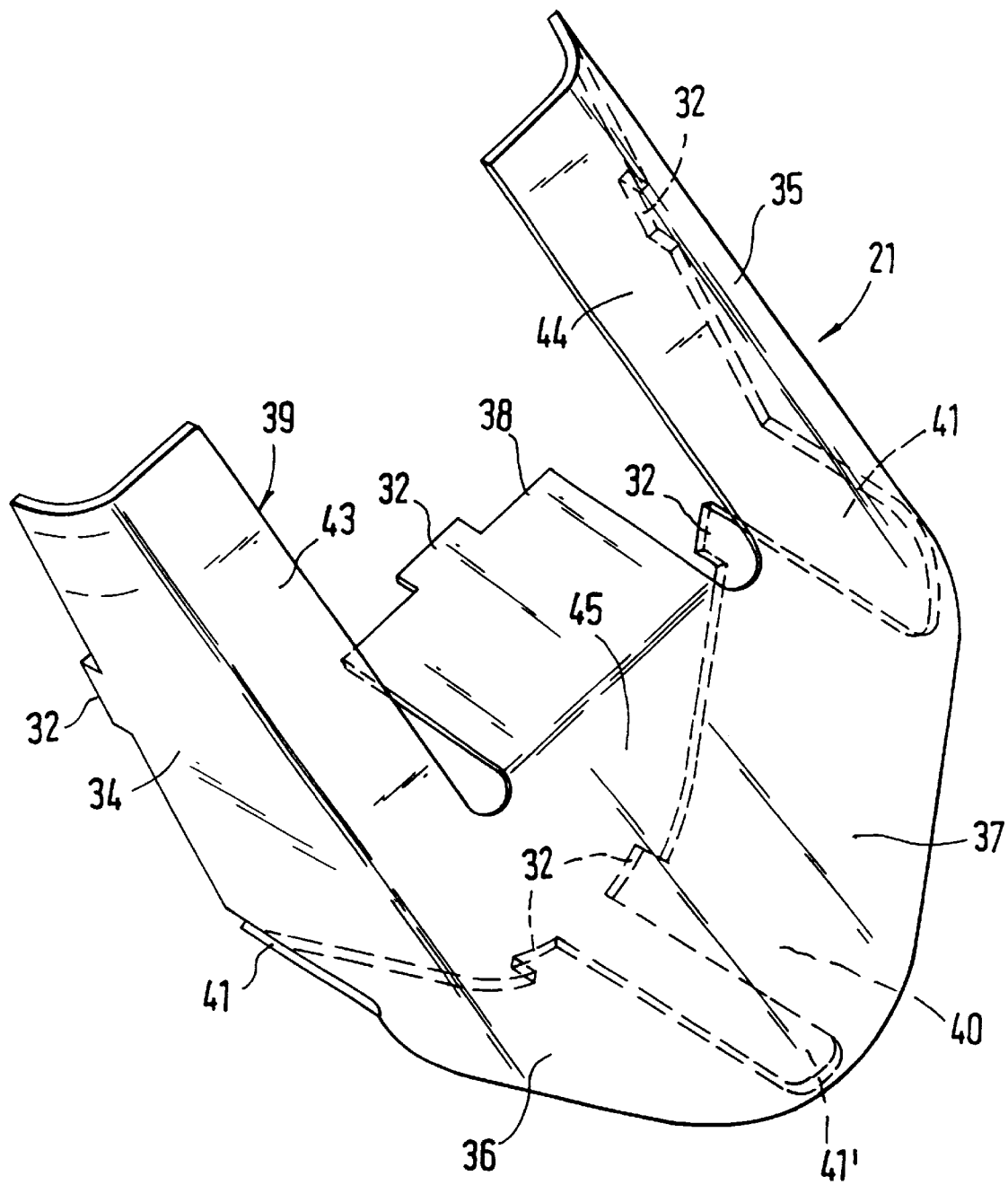
FIG. 5 is a perspective view of the deformation body placed on the base plate.

Locally punched-out, oblong openings 31 (see FIG. 4) are provided on the base plate 20, through which bent-out rectangular tongues 32 (see FIG. 5) of the deformation body 21 are guided. Projecting sections of the tongues 32 may be bent on the backside of the base plate 20. The deformation body 21 comprises an impact surface 33 which is aligned, at least in sections, approximately in parallel and at a distance C with respect to the base plate 20 and which is supported on the base plate 20 by way of side walls 34, 35, 36, 37, 38 which extend approximately perpendicularly to the base plate 20. The measurement C defines the deformation path required for the energy absorption. When viewed from he passenger compartment, the impact surface 33 of the deformation body 9 has a similar shape as the base plate 20 situated behind it; that is, it is also composed of an approximately U-shaped section 39 and a triangular section 40. The triangular section 40 of the impact surface 33 extends approximately in parallel to the base plate 20, whereas the impact surface 33 extends diagonally upwards on the outside in the area of the U-shaped section 39. The adjoining side walls 34, 35, 36, 37 are in each case separated from one another by recesses 41, 41' which are open in the direction of the base plate 20. The recesses 41, 41' extend approximately to the impact surface 33; that is, only one narrow web 42 respectively extends between the impact surface 33 and the recesses 41, 41'. The deformation body 9 may also have a different shape.

The side walls 34, 35 are assigned to the U-shaped section 39 of the impact surface 33 and extend from the exterior side of the lateral legs 43, 44 toward the base plate 20. The side walls 34, 35 have a continuously changing height along their longitudinal course.

The side walls 36, 37 which are assigned to the triangular section 40 have a uniform height along their longitudinal course. The side wall 38 leads away from the connection web 45 of the U-shaped section 39 and is supported on the base plate 20 at its free end. This side wall 38 has a smaller width than the cut-open space which is defined by the interior edge of the legs 24, 25 or 43, 44 of the base plate 20 and the impact surface 33.

For the defined energy absorption, additional weakened areas 47 may be provided on the side walls 34 to 38 of the deformation body 21, which weakened areas are formed, for example, by slots or the like (see FIG. 3). The number and size of the weakened areas 47 is empirically determined according to the application.

The deformation element 9 in the illustrated embodiment is placed onto the free end 48 of a supporting part 49 which projects toward the occupant compartment 6 and is fastened to it. For this purpose, the base plate 20 of the deformation element 9 is fixedly connected with the supporting part 49 made of plastic. This can take place by way of gluing, snapping, a plug-type connection or the like. The other end 50 of the supporting part 49, which is approximately U-shaped in the top view, is fixedly connected with the adjusting member 11 by means of snapping or the like. The supporting part 49 may also be constructed in one piece with the adjusting member 11. In addition, the deformation element 9 rests in sections on the head section 8 of the fastening screw 3.

Figure 6:
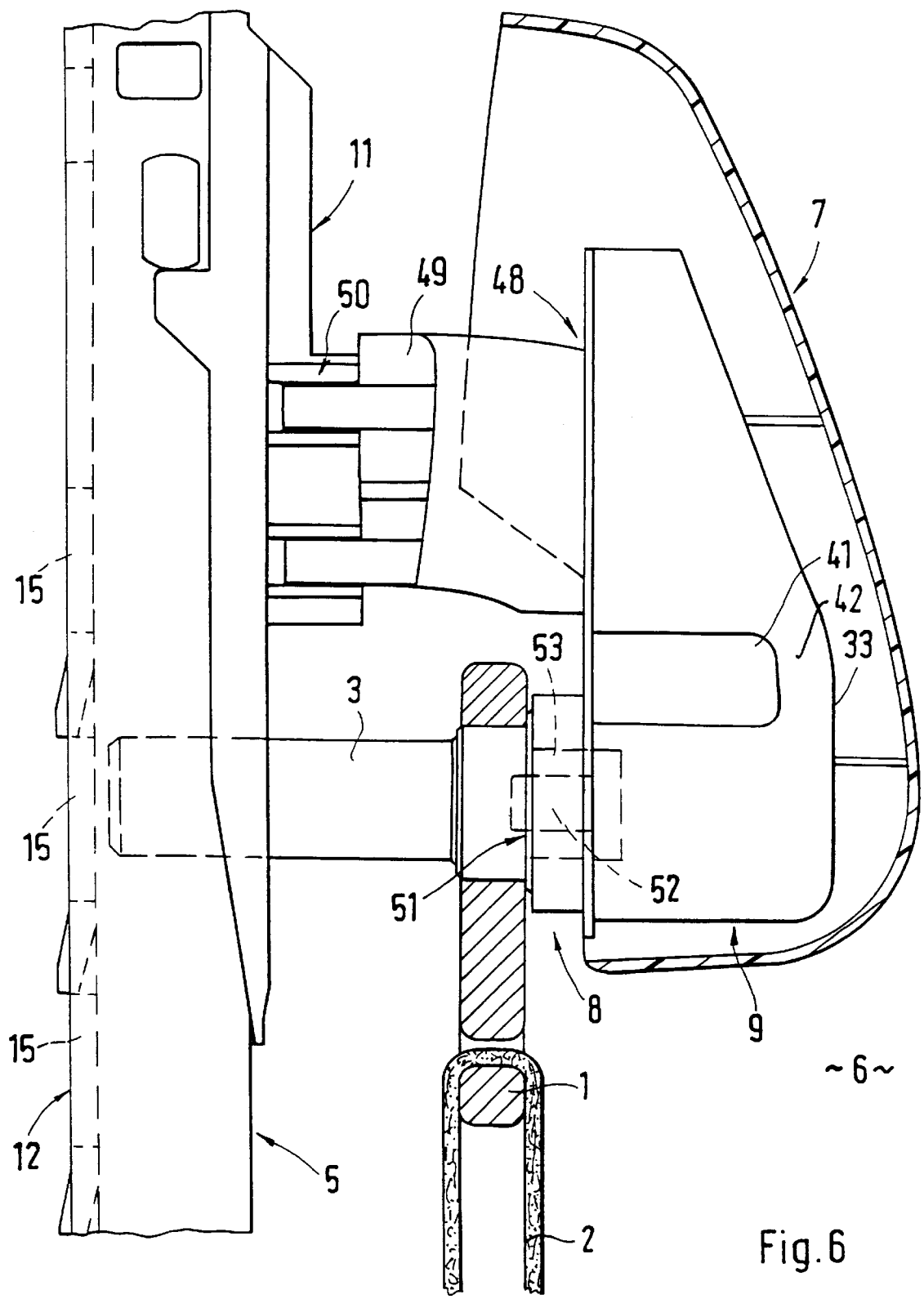
FIG. 6 is an enlarged view of a detail area X of FIG. 2.

In order to avoid a lateral displacement of the deformation element 9 in the event of an impact shock, a fixing device 51 (FIG. 6) is provided between the deformation element 9 and the fastening screw 3. According to a first embodiment, this fixing device 51 comprises a projecting fixing pin 52 which is mounted on the base plate 20 and which engages in a bore 53 arranged at the head section 8 of the fastening screw 3. In this case, the bore 53 may have a slightly larger diameter than the outside diameter of the fixing pin 52. However, the fixing device 51 may also be formed by a screw which, on the head side, is supported on the base plate and which is screwed into a threaded bore of the fastening screw 3 for the deflection fitting 1.

The cap 7 made of plastic (for example, PC, ABS) can be fastened, for example, by way of snapping, to the deformation element 9.

The recessed areas of the base plate 20 and of the deformation body 21 between the lateral legs 24, 25 or 43, 44 of the U-shaped sections 22 or 39 are used for receiving the swivellable operating member 16 of the belt level adjusting device 5. The other area of the operating member 16 is adapted to the shape of the cap 7 so that, when the belt level adjusting device 5 is locked, the operating member 16 extends flush with the surface with respect to the cap 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Deflection fitting for a seat belt of a motor vehicle, which is held in position via a fastening screw, a head section of the fastening screw and at least a partial area of the deflection fitting being covered by a cap toward an occupant compartment of the vehicle, wherein a hollow deformation element is disposed between the head section of the fastening screw and the cap, said deformation element being made of thin-walled sheet metal, and wherein the deformation element comprises a base plate and a deformation body placed on the base plate, said base plate in use being disposed between the head section of the screw and the cap.

2. Deflection fitting according to claim 1, wherein the deformation element is constructed in one piece.

3. Deflection fitting according to claim 1, wherein the deformation element is constructed in several pieces.

4. Deflection fitting according to claim 1, wherein the base plate and the deformation body are connected with one another by at least one of a flanged connection, a welded connection, and an adhesive connection.

5. Deflection fitting according to claim 1, wherein the cap can be fastened to the deformation element.

6. Deflection fitting according to claim 1, wherein the deformation body has an impact surface which, at least in sections, is aligned approximately in parallel to the base plate and which is supported on the base plate by way of side walls which extend approximately perpendicularly with respect to the base plate.

7. Deflection fitting according to claim 6, wherein recesses are provided between adjacent ones of the side walls.

8. Deflection fitting according to claim 6, wherein locally defined weakened areas are provided on at least one of the side walls.

9. Deflection fitting for a seat belt of a motor vehicle, the deflection fitting being mounted on a belt adjusting device comprising a holding rail fastened to the vehicle body and an adjusting member displaceably movably arranged on the holding rail, the deflection fitting being fastened on the adjusting member via a fastening screw, wherein a deformation element is held in position by a supporting part on the adjusting member of the belt adjusting device, the deformation element resting in sections on a head section of the fastening screw.

10. Deflection fitting according to claim 9, wherein the deformation element interacts with the head section of the fastening screw via a fixing device preventing a lateral displacement.

11. Deflection fitting according to claim 10, wherein the deformation element includes a base plate, a projecting fixing pin being mounted on the base plate and engaging in a bore arranged on the head section of the fastening screw.

12. Deflection fitting according to claim 9, wherein the deformation element comprises a base plate and a deformation body placed on the base plate, respective cut-open areas being constructed on the base plate, on the deformation body and on the cap, an operating element, which is swivellably disposed on the adjusting member, penetrating the cut-open areas of the base plate and of the deformation body for adjusting the belt level adjusting device.

\* \* \* \* \*